United States Patent [19]

Sistrunk et al.

[11] Patent Number: 5,636,852

[45] Date of Patent: Jun. 10, 1997

[54] RECREATIONAL EQUIPMENT TRANSPORTER

[76] Inventors: Ronald R. Sistrunk; John D. Sistrunk, III, both of 4925 Greenville Ave., Ste. #815, Dallas, Tex. 75206

[21] Appl. No.: 493,386

[22] Filed: Jun. 21, 1995

[51] Int. Cl.$^6$ ..................................................... B62B 1/12
[52] U.S. Cl. .......................... 280/30; 248/156; 280/204; 280/646; 280/47.19; 280/47.29
[58] Field of Search .............................. 248/96, 156, 545; 280/30, 47.18, 47.19, 204, 292, 47.26, 47.27, 47.28, 47.29, 646, 42, 47.33, 47.17

[56] References Cited

U.S. PATENT DOCUMENTS

| | | | |
|---|---|---|---|
| D. 345,842 | 4/1994 | Sloan et al. . | |
| 2,070,254 | 2/1937 | Burgner | 248/96 X |
| 2,751,176 | 6/1956 | Mowry | 248/96 |
| 2,880,012 | 3/1959 | Wilson | 280/47.19 |
| 3,081,108 | 3/1963 | Vogt | 280/47.19 |
| 3,677,571 | 7/1972 | Maturo, Jr. et al. . | |
| 3,693,993 | 9/1972 | Mazzarelli et al. . | |
| 4,316,615 | 2/1982 | Willette . | |
| 4,318,567 | 3/1982 | Guthier | 248/156 X |
| 4,460,188 | 7/1984 | Maloof | 280/30 |
| 4,550,930 | 11/1985 | Proffit | 280/47.18 X |
| 4,618,157 | 10/1986 | Resnick . | |
| 4,759,559 | 7/1988 | Moulton | 280/204 X |
| 5,002,304 | 3/1991 | Carrigan, Jr. . | |
| 5,005,847 | 4/1991 | King et al. | 280/47.28 X |
| 5,100,198 | 3/1992 | Baltzell . | |
| 5,197,754 | 3/1993 | Ward . | |
| 5,269,157 | 12/1993 | Ciminelli et al. . | |
| 5,362,079 | 11/1994 | Graham . | |
| 5,464,237 | 11/1995 | Saporiti | 280/30 |
| 5,482,304 | 1/1996 | Smith | 280/204 |

*Primary Examiner*—Brian L. Johnson
*Assistant Examiner*—Michael Mar
*Attorney, Agent, or Firm*—Richard C. Litman

[57] ABSTRACT

A recreational equipment transportation apparatus including a tubular frame with a detachable handle pivotally mounted thereto. A pivotally-mounted first platform receives an ice chest. The top surface of the ice chest defines a second platform on which a recreational equipment compartment (REC) is received. Detachable straps maintain the REC against the frame. A center stake, slidingly received in the frame, and a handle stake, slidingly received in the handle are selectably penetrable in the surface maintaining the apparatus. The center stake prevents the wheels from rolling. The handle stake and the wheels define a stable tripod platform for the recreation site. The invention also provides for shelter including an umbrella, tent, blind and/or netting draped over the frame. The invention also may include batteries and/or solar cells for energizing lamps and/or outlets on the frame. The invention may be transported by any one of a number of locomotive means, e.g., a bicycle.

15 Claims, 7 Drawing Sheets

RECREATIONAL EQUIPMENT TRANSPORTER

BACKGROUND OF THE INVENTION

1. Field of the Invention

This invention relates to collapsible carts. More specifically, the present invention relates to carts for transporting numerous and often awkward items across treacherous terrain.

2. Description of the Prior Art

A great number of people pursue out-of-doors activities. Some seek the beaches; others head for the woods. Typically, outdoorsmen often bring with them comestibles, games, floats, chairs radios, lights, umbrellas or shelters, among others. However, outdoor adventurists usually can not conveniently carry all of these items on their persons. Additionally, the unpaved surface over which these rugged individuals must traverse makes transporting these articles problematic.

Once at a designated site, either to provide some relief from the sun's powerful rays or out of respect for the mercurial nature of nature, outdoor enthusiasts often set up shelters. Beach visitors often play radios or use other electronic devices. Some adventurists shoulder small day packs and explore the surroundings. A need exists for a universal recreational equipment transporter that fosters the personal goals of all outdoor enthusiasts. The need extends to a transporter that is adjustable to the constraints of the load being transported and the terrain on which it is transported. The need encompasses an invention having a replenishable energy supply and bearing the necessary structure for providing shelter. Further, the need includes amenability to being transported by various conveyance modes and, once conveyed, amenability to being secured to the ground.

Several types of recreational equipment transporters are described in the literature. However, none provide for supplying energy, adjusting the transporter wheel base, supporting a shelter or being anchored to the ground. For example, U.S. Pat. No. Des. 345,842, issued Apr. 5, 1994, to Harry Sloan et al., describes a beach cart. The apparatus is shown having a generally inverted F-shaped dolly with two wheels. A permanent storage compartment having a closure is shown nested between the horizontal arms of the cart.

U.S. Pat. No. 3,677,571, issued Jul. 18, 1972, to Thomas F. Maturo, Jr. et al., and U.S. Pat. No. 5,197,754, issued Mar. 30, 1993, to Lyla B. Ward, each describe a beach cart. Each device includes a collapsible, ladle-shaped, tubular frame. In each, a partitioned, pliable pouch is secured by its upper edges to the edges of the ladle. The Maturo invention includes a singular wheel rotatably mounted thereto. The wheel is constructed from a cylinder of wire mesh. The Ward invention includes two wheels on a common axle, mounted at the vertex of the frame.

U.S. Pat. No. 3,693,993, issued Sep. 26, 1972, to Peter Mazzarelli et al., describes a beach tote cart. The apparatus includes a pair of frames hinged together. An elongated rollable cylinder is mounted on one end of the frame. Collapsible legs extend transversely from either frame.

U.S. Pat. No. 4,316,615, issued Feb. 23, 1982, to Norval K. Willette, describes a picnic beach cart. The device includes a horizontal tray with upstanding, transverse rails. A downstanding, transverse rail supports one end of the tray. Two wheels are rotatably mounted on and support the end of the tray. A T-shaped handle is connected to the tray. The handle may be articulated into a position for supporting the tray in combination with the wheels.

U.S. Pat. No. 4,618,157, issued Oct. 21, 1986, to Sharon H. Resnick, describes a beach hand cart. The apparatus includes a generally L-shaped, extensible, adjustable and collapsible tubular frame mounted on two skis. A wheel is rotatably mounted at the front of each ski.

U.S. Pat. No. 5,002,304, issued Mar. 26, 1991, to Richard M. Carrigan, Jr., describes a collapsible cart. The device includes a generally L-shaped extensible and collapsible tubular frame. Two wheels on a common axle are mounted at the vertex of the frame.

U.S. Pat. No. 5,100,198, issued Mar. 31, 1992, to Ricky L. Baltzell, describes a seat cooler apparatus. The apparatus includes a box-shaped frame. A cooler is slidably received in the frame. A collapsible seat is mounted on top of the frame. An umbrella is received in a cup mounted on a vertical edge of the frame. An extensible horizontal shelf with retractable legs is received in a slot in the side of the frame. A number of retractable wheels are mounted on the lower corners of the frame. A handle attaches to the back lower edge of the frame.

U.S. Pat. No. 5,269,157, issued Dec. 14, 1993, to Michael Ciminelli et al., describes an insulated beach box with utility attachments. The apparatus includes a generally box-shaped container with a collapsible tubular frame extending from and generally parallel to the rear vertical side of the container. The container is insulated. The top panel of the container provides a closure for the container and a sitting surface. Two wheels on a common axle are mounted at the lower rear edge of the container. An umbrella mounts on the tubular frame and the ground.

U.S. Pat. No. 5,362,079, issued Nov. 8, 1994, to Gary Graham, describes a beach caddy. The device includes a generally triangular-shaped frame. A handle extends from the top vertex. Two wheels on a common axle are mounted at the lower edge of the frame. The lower edge has a lip for receiving the lower rail of a conventional, collapsible aluminum chair. The upper rail of the aluminum chair loops around the back of the frame. The frame and aluminum chair combine to form a dolly.

Clearly, the above demonstrates a need for a collapsible recreational equipment transporter that supplies energy accommodates detachable, body-mounted packs, may be transported by multiple conveyance means, may be secured to the ground and may be converted into a shelter.

None of the above references, taken alone or in combination, are seen as teaching or suggesting the presently claimed recreational equipment transporter.

SUMMARY OF THE INVENTION

The present invention overcomes the limitations of the above inventions by providing a light weight, collapsible, adjustable recreational equipment transporter including a replenishable energy supply means, means for providing shelter and means for securing to the ground that is amenable to multiple conveyance modes.

The invention includes a tubular frame with a detachable handle pivotally mounted thereto. The frame is pivotally mounted on a first platform, defining an L-shaped dolly. The frame and first platform are rotatably mounted on two independent wheels.

The first platform supports an ice chest. The ice chest is maintained against the frame by detachable straps and supported on the sides by hinged bars that attach to the platform. The top surface of the ice chest defines a second platform.

The second platform vertically supports a recreational equipment compartment (REC) which is attached to the support bar. Detachable straps secure the REC against the frame. The REC is convertible into a backpack with or without a frame, or duffle bag.

The invention provides a tripod staking system. The tripod staking system employs the wheels, a center stake and a handle stake slidably received in the handle for securing the invention in situ. The center stake prevents the wheels from rolling. The handle stake and the wheels define a stable tripod platform for the recreation site, secure against wind pressure.

The invention also provides for shelter. One embodiment includes an umbrella mounted on and above the frame. Another embodiment includes a tent or blind draped over the umbrella support pole. Additionally, netting may be draped over the umbrella or pole to protect the user from insects or to serve as camouflage.

The invention also includes means for supplying electrical power. The means may include batteries and/or solar cells. The solar panels may be mounted on the umbrella. The invention also includes outlets by which lamps, radios and the like may be energized.

The invention may be transported by any one of a number of locomotive means. The handle may be manually pulled or pushed, or connected to known locomotive devices, such as a bicycle.

In consideration of the above, an object of the invention is to provide a recreational equipment transporter for transporting items to a variety of recreational sites, obviating the necessity for multiple trips to a base vehicle.

Another object of the invention is to provide a recreational equipment transporter having a detachable recreational equipment compartment convertible into a backpack or duffle bag.

A further object of the invention is to provide a recreational equipment transporter with a replenishable electrical energy supply.

An additional object of the invention is to provide a recreational equipment transporter having an umbrella that is convertible into a support pole for a shelter.

Yet another object of the invention is to provide a recreational equipment transporter having a tripod staking system for establishing a site with maximum stability.

Yet a further object of the invention is to provide a recreational equipment transporter that is collapsible and adjustable to suit the constraints of a load.

Yet an additional object of the invention is to provide a recreational equipment transporter having a contractible wheel base that distributes weight in a stable manner and allows for passage through congested areas or narrow ways.

Still another object of the invention is to provide a recreational equipment transporter that may be transported by any one of a number of locomotive means.

Still a further object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features of the invention consistently throughout the attached drawings.

DETAILED DESCRIPTION OF THE PREFERRED EMBODIMENTS

Figure 1:
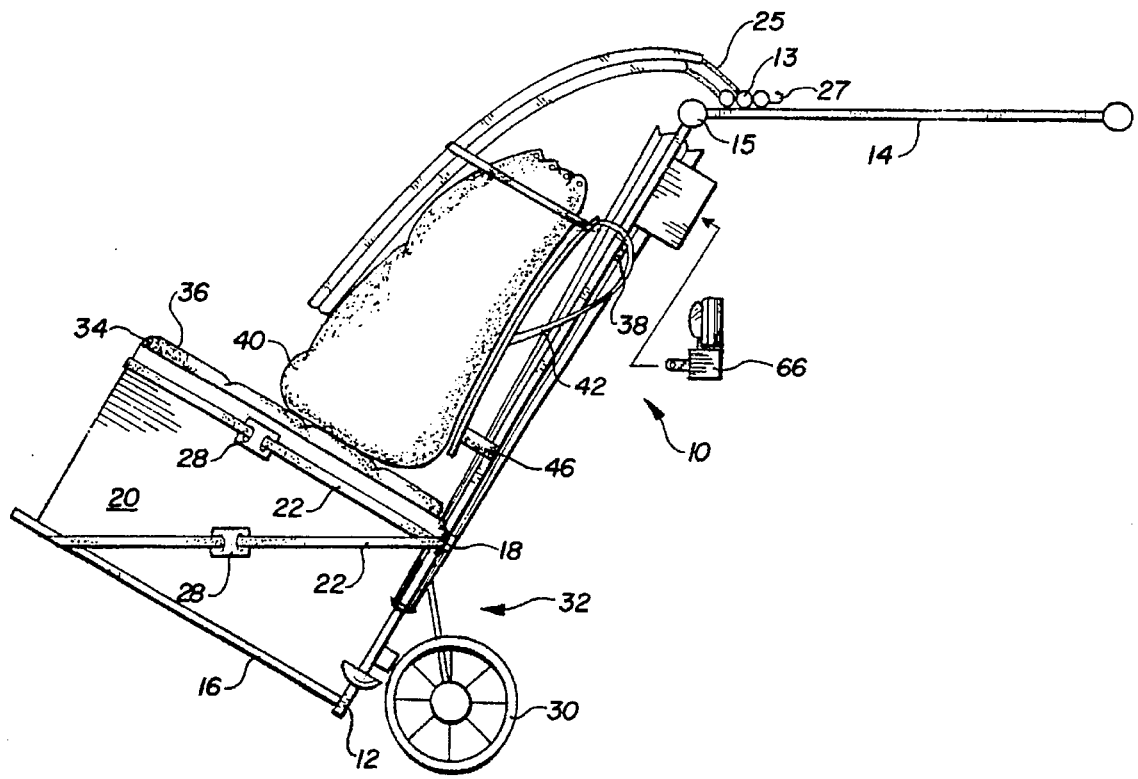
FIG. 1 is a side elevational view of the invention loaded with recreational equipment.
Figure 2:
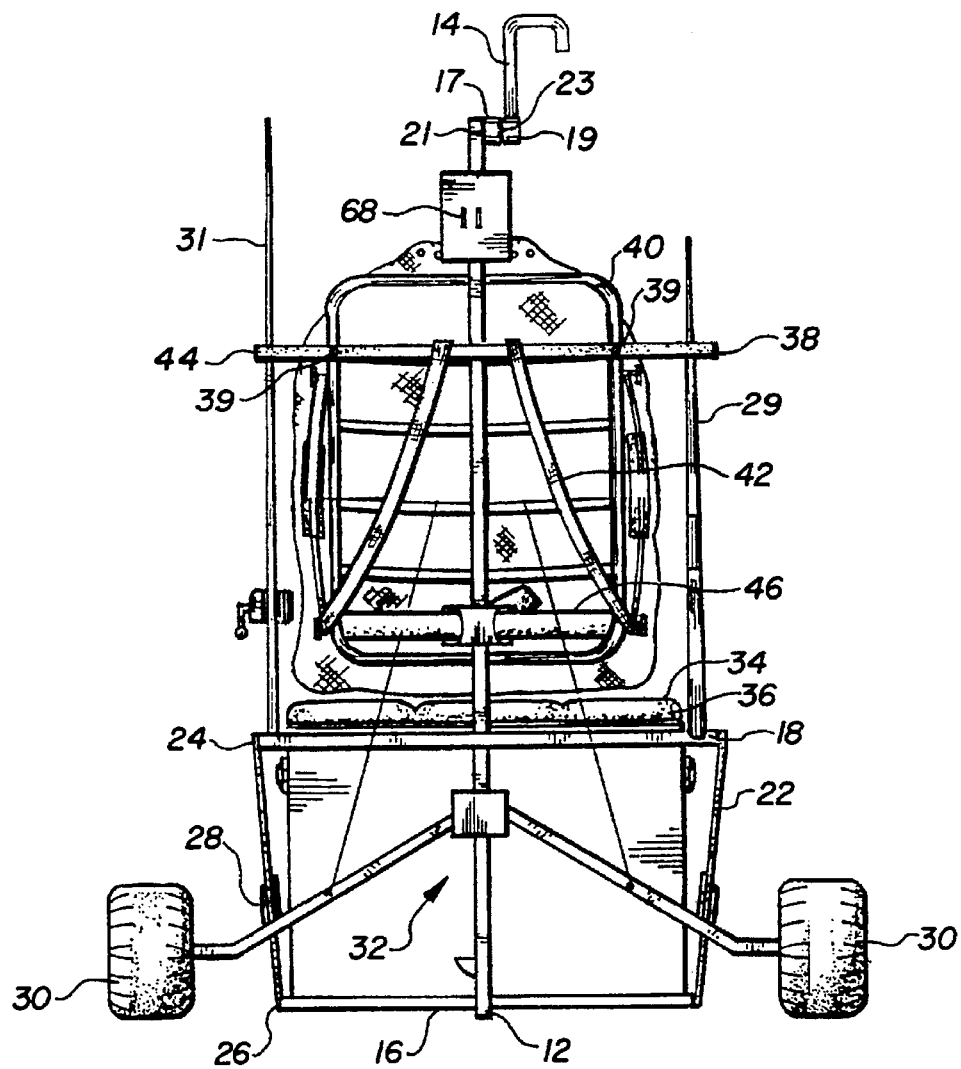
FIG. 2 is a rear elevational view of the invention showing expansible horizontal members.

Referring to FIGS. 1 and 2, the invention includes a tubular frame 10. The frame 10 has a vertical central member 12 with a handle 14 demountably and pivotally mounted thereto. The pivot mechanism 15 includes two circular disks 17 and 19, one mounted on the central member 12, the other on the handle 14. Each disk 17 and 19 has radially diverged teeth 21 and 23 that interengage. The user may disengage the teeth 21 and 23 in order to permit articulation of the handle, similar to a conventional golf cart. The handle 14 is shown being ergonomically crooked, providing the user with maximum mechanical advantage for pulling or pushing the invention fully loaded. However, the handle 14 may be straight or terminate in coupling means, discussed infra.

A plurality of tie down attachments 13 are disposed along the handle 14 for receiving chord 25, bungee hooks (not shown) and the like. A hook 27 is provided for hanging items, such as a bag 11, as shown on FIG. 4, or a REC 40, discussed infra, as shown on FIG. 5.

A first platform 16 is rotatably mounted on the central member 12, the platform 16 and central member 12 defining an L-shape dolly. The first platform 16 may be constructed from a solid or foraminous panel. The first platform 16 may be articulated from a service position to a stored position, as shown on FIG. 3. Additionally, the platform 16 may be biased toward the stored position by a spring (not shown). Preferably, the first platform 16 receives and maintains an ice chest 20.

A lower horizontal member 18 is mounted on the central member 12. The lower horizontal member 18 is expansible to receive additional items such as a rifle 29 or fishing rod 31, as shown in FIG. 2. The lower horizontal member 18 provides lateral support for items loaded on the first platform 16.

The ice chest 20 may be a simple, insulated cooler or have powered cooling or heating means, such as a propane-fueled or electronic compressor. The ice chest 20 has a panel 34 which defines a second platform 36. The second platform 36 is shown generally co-planer with the lower horizontal member 18. If an item other than an ice chest 20 is received on the first platform 16, the top surface of the item defines the second platform 36. Alternatively, the invention may include a panel (not shown) similar to the panel 34 defining the first platform 16 pivotally mounted on the lower horizontal member 18. The additional panel (not shown) would provide for introducing items on the first platform 16 having top surfaces ill-suited for maintaining other items thereon.

Straps 22 are shown interposed between each distal end 24 of the lower horizontal member 18 and the laterally associated distal corner 26 of the first platform 16. The straps 22 maintain the ice chest 20 or other item on the first platform 16. The straps 22 are shown being individually adjustable by known adjustment means 28. Elastic means may be incorporated into the straps 22, providing for a snug fit against the item placed on the first platform 16 or to bias the first platform 16 toward a normally stored position. Additionally, and as seen in FIG. 1, another strap 22 and adjustment means 28 are provided, encircling the upper area of the chest 20 to further secure the same in place.

An upper horizontal member 38 is mounted on the central member 12. The upper horizontal member 38 is expansible, similar to the lower horizontal member 18, to receive additional items such as a rifle 29 or fishing rod 31, as shown in FIG. 2. The upper horizontal member 38 provides lateral support for items loaded on the second platform 36. Preferably, the second platform 36 receives and maintains a REC 40.

The REC 40, similar to a conventional framed or frameless back pack or duffle bag, has two vertical straps 42 each receiving an end 44 of the upper horizontal member 38. The REC 40 also has one horizontal strap 46, the lumbar strap of a conventional back pack, which may be looped and secured about the central member 12. The conventional frame of the backpack, if provided, is clipped as at 39 to the upper horizontal member 38 for primary security. Also, the vertical straps 42 and the horizontal straps 46 laterally secure the REC 40 against the frame 10.

Figure 3:
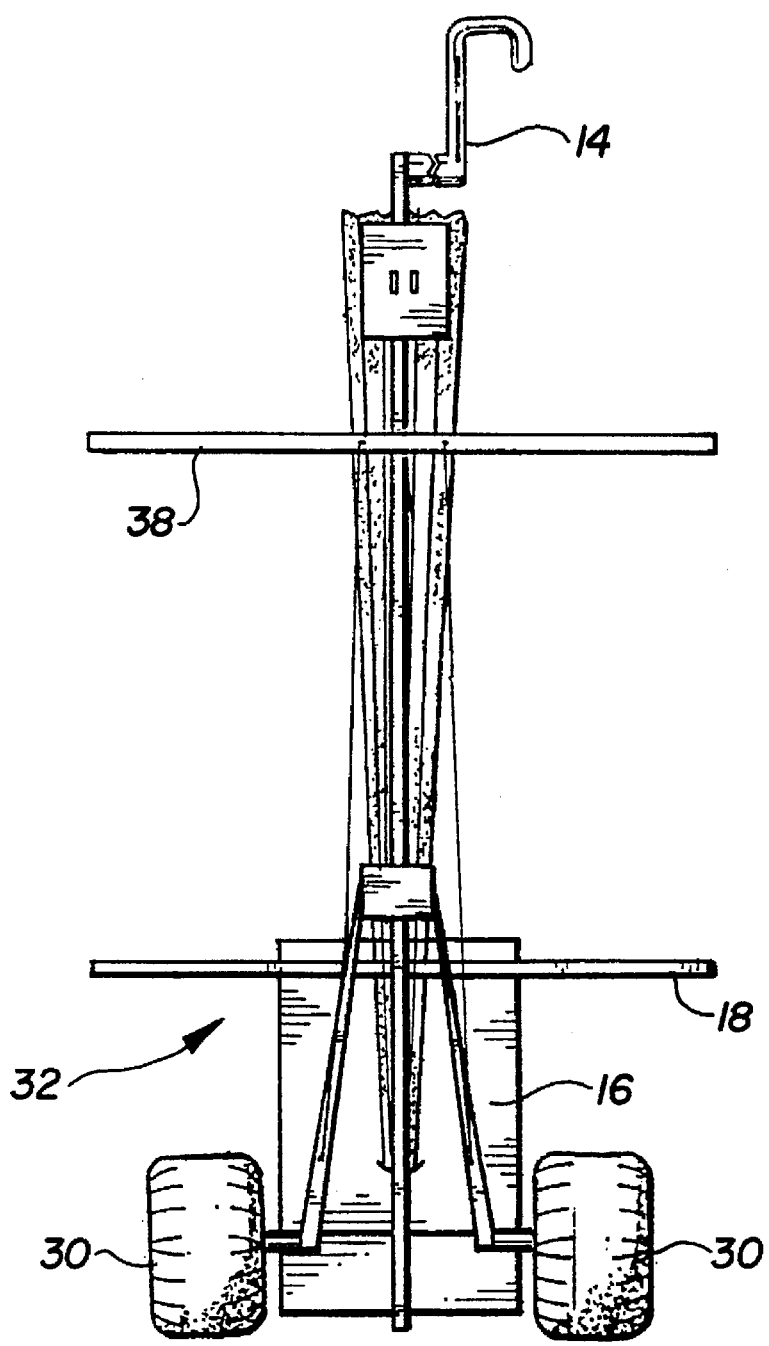
FIG. 3 is a rear elevational view of the frame collapsed for storage.

Referring further to FIG. 2 and also to FIG. 3, the invention includes a suspension mechanism 32 mounted on the frame 10. The suspension mechanism 32 is intended to include known means for adjusting the distance between the wheels 30 similar to a golf cart, in other words, for moving the wheels from a spread disposition for use, as seen in FIG. 2, to a stowed, folded disposition, seen in FIG. 3. As an additional feature, the suspension mechanism 32 may provide for adjusting the wheel base by angularly articulating the handle 14 relative to the frame 10. When the handle 14 is articulated downwardly, the wheel distance decreases and vice versa.

A pair of wheels 30 are independently, rotatably mounted on the suspension mechanism. Depending on the conditions of the pathway to be used, wheel design may be selected to reduce the friction and/or enhance the balance of the invention. When encountering lose sand or soil, a wider wheel 30 having a smooth surface is preferred. The wheel 30 should be contoured to graduate inward from the central axis to outer surface. Also, the wheel surface should have a spiral-cut exterior core to displace lose soil from the centerline of the wheel outward. When traversing rugged or rough compacted surface conditions, the invention should include inflatable, high traction wheels (not shown).

Figure 4:
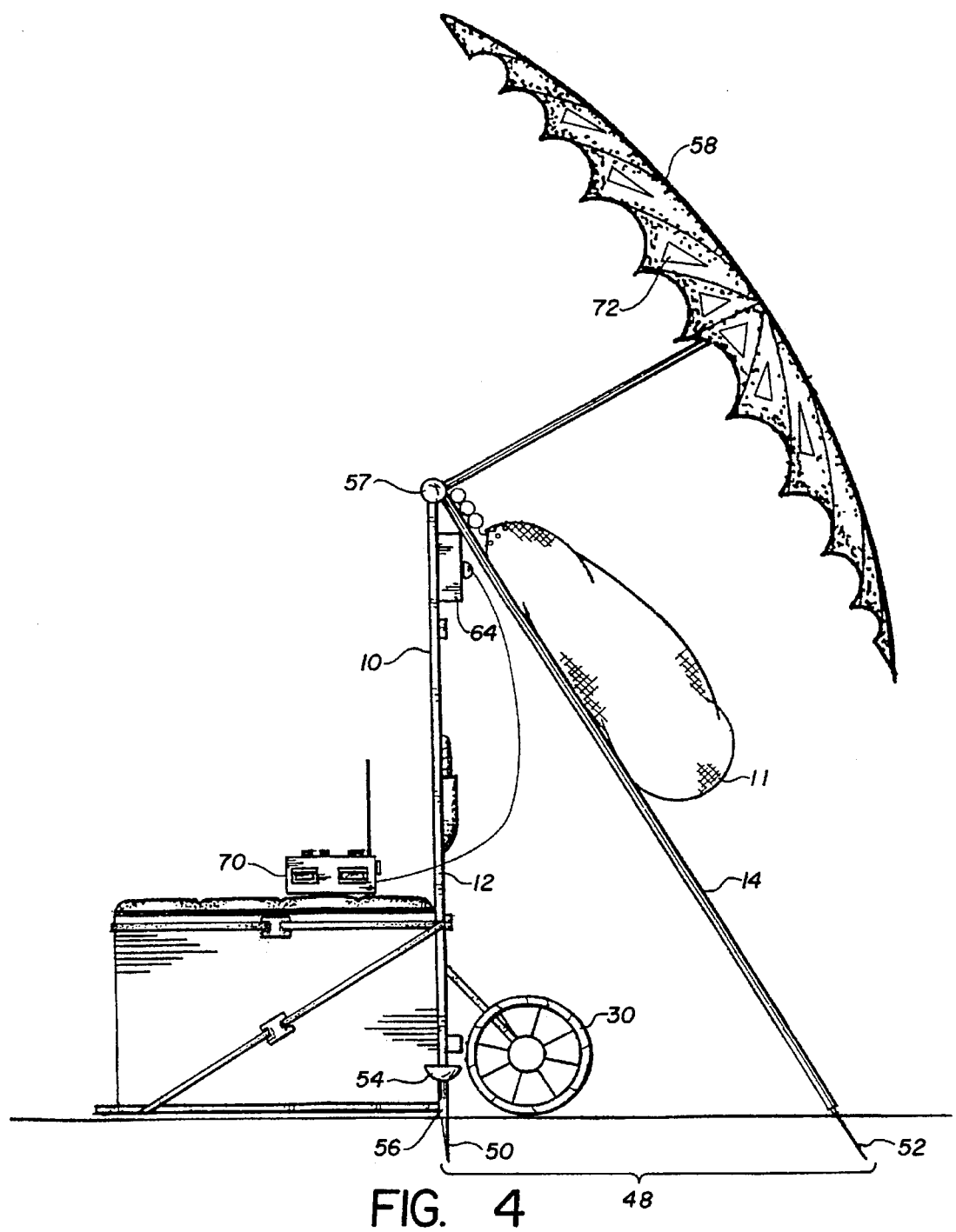
FIG. 4 is a side elevational view of the invention staked and with umbrella raised.

Referring to FIG. 4, the invention provides a tripod staking system 48 for securing the invention in situ. The tripod staking system 48 employs the wheels 30, a center stake 50, slidingly received in the central member 12, and a handle stake 52, slidingly received in the handle 14. The center stake 50 is connected to a foot pedal 54 for driving the center stake 50 into the ground. A shaft (not shown), interposed between the center stake 50 and foot pedal 54, is slidingly received in a longitudinal slot 56 through the central member 12. The center stake 50 may be biased upwardly with a spring (not shown) to deter contact with the ground during transportation of the invention. When the invention is properly situated, the user steps on the foot pedal 54 and drives the center stake 50 into the ground to deter the invention from rolling. The center stake 50 contacts the ground between the wheels and proximate to the line defined by the points at which the wheels contact the ground. The wheels 30 define two outer points of a tripod. The handle stake 52 contacts the ground and defines the third point of the tripod. The length of the handle stake 52 may be adjusted for any size tripod configuration desired. The tripod staking system secures the invention against wind pressures.

The invention also provides for shelter. In one embodiment of the invention, an umbrella 58 is mounted on the frame 10 by known coupling means 57. The umbrella 58 may be articulated from an opened attitude to a closed attitude. The umbrella 58 also is rotatable from a vertically down position through a vertically up position and may be fixed at any position therebetween to maximize protection from sun or inclement weather.

Figure 5:
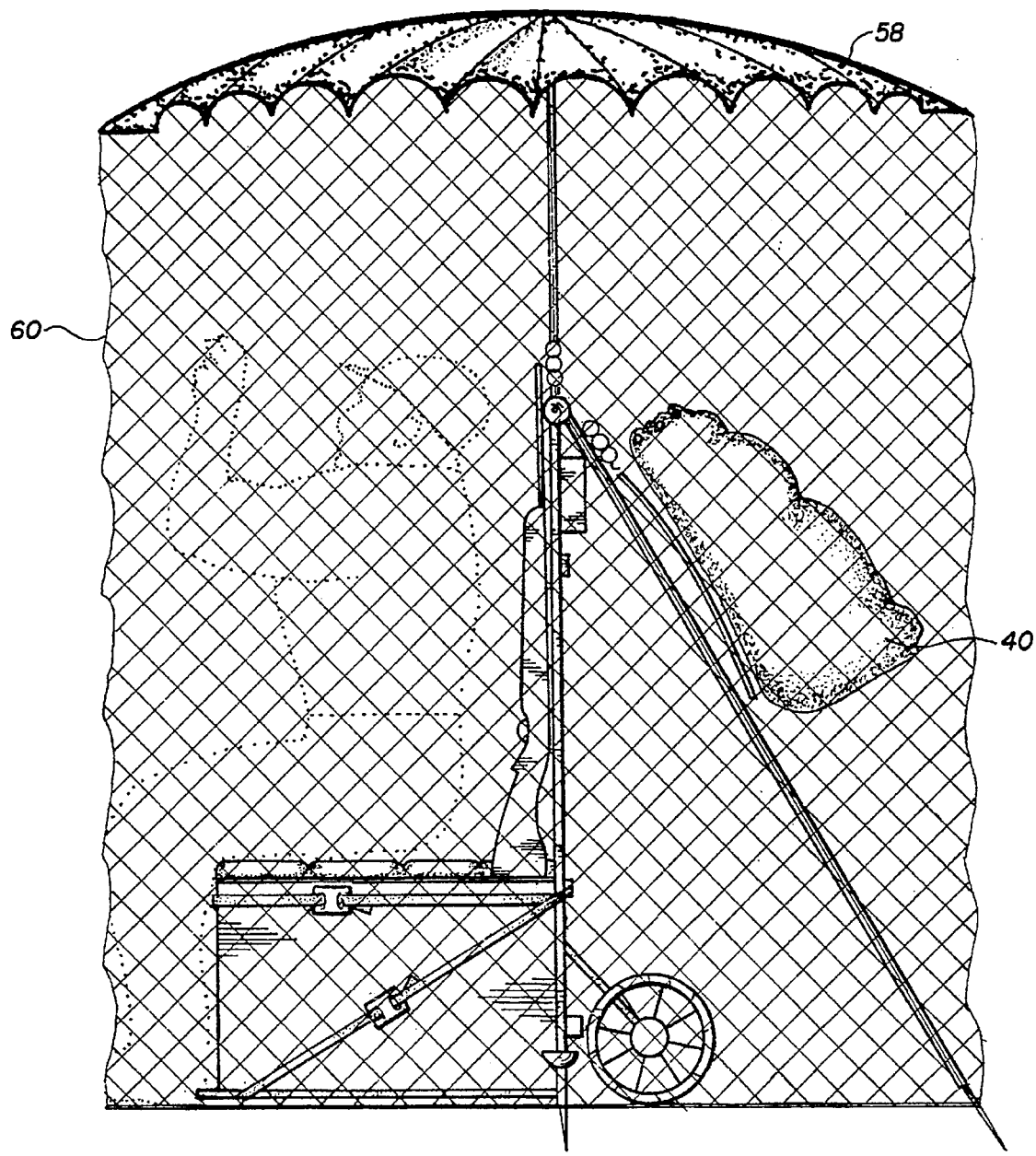
FIG. 5 is a side elevational view of the invention with netting draped over umbrella and a user seated on ice chest.

Referring also to FIG. 5, a second embodiment of the shelter provided by the invention is shown. The umbrella 58 is articulated to a vertically up position and an opened attitude. A netting 60 is draped over the top of the umbrella 58. The netting 60 may be of the fine-meshed mosquito-type for protecting those taking shelter from biting insects. The netting 60 also may be of the coarse-meshed camouflage-type for rendering those taking shelter indiscernible from the surroundings.

Figure 6:
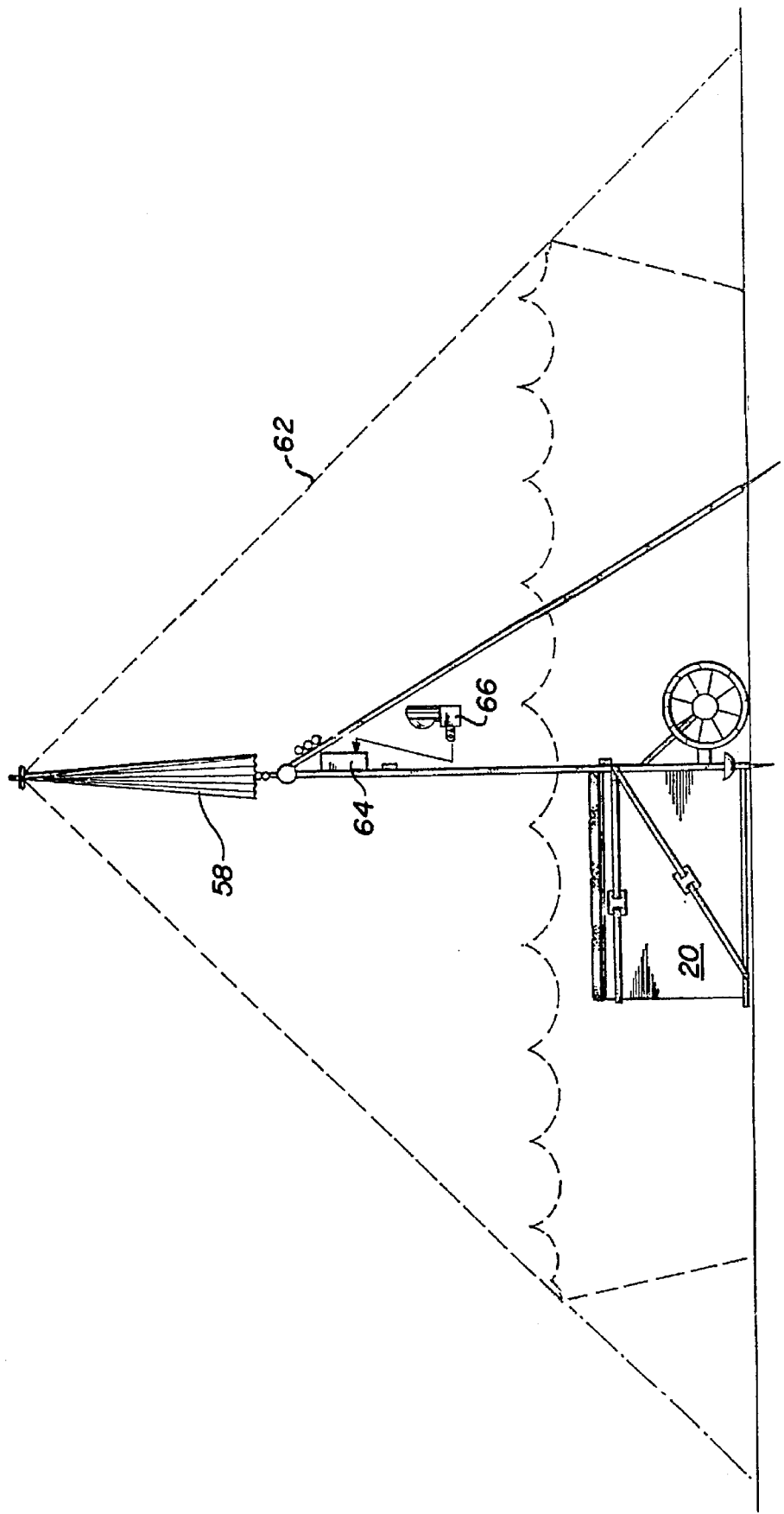
FIG. 6 is a side elevational view of the invention with a tent draped over the umbrella.

Referring to FIG. 6, a third embodiment of the shelter provided by the invention is shown. The umbrella 58 is articulated to a closed attitude and a vertically up position. A tepee-shaped tent 62 or blind (not shown) is draped over the umbrella support pole.

The invention is shown including a battery 64 for supplying electrical power. The battery 64 is shown energizing a lamp 66. The battery 64 may also energize at least one other service outlet 68. The service outlet 68 permits a user to plug in a radio 70, as shown on FIG. 4, or other appliance. Solar cells 72, shown mounted on the umbrella 58, may generate electrical energy which is received and stored by the battery 64.

Figure 7:
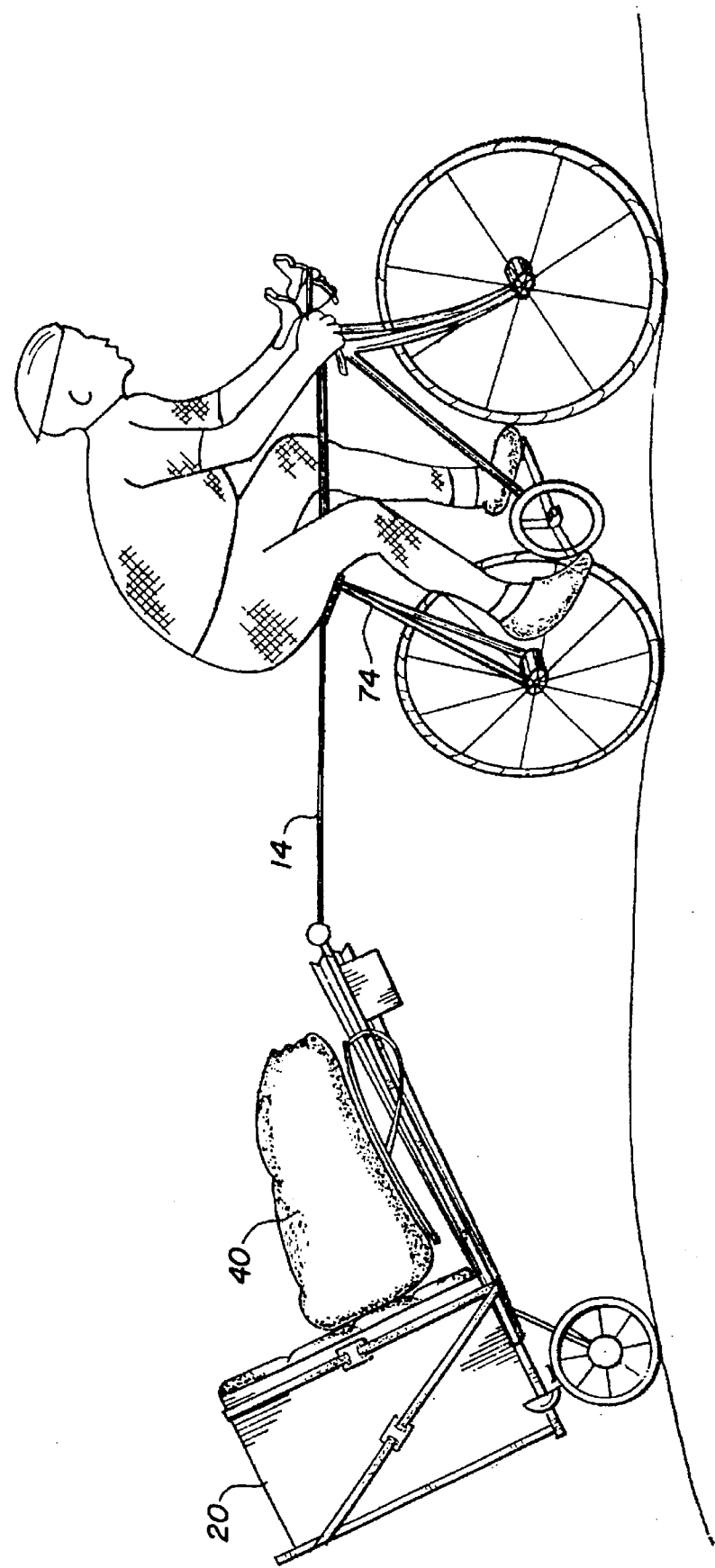
FIG. 7 is an environmental perspective view of the invention being drawn by bicycle.

Referring to FIG. 7, the invention accommodates a multiplicity of locomotive means. As discussed supra, the handle 14 may be manually pulled or pushed. As shown in FIG. 7, the invention may include a handle 14 having a coupling for attachment to a bicycle 74. However, any locomotive means, human-powered or otherwise, may be used to transport the device.

The present invention is not intended to be limited to the embodiments described above, but to encompass any and all embodiments within the scope of the following claims.

We claim:

1. A transportation apparatus comprising:
   a frame having an upper end and an opposite lower end;
   a handle having an inner end pivotally mounted on said frame at said upper end, said handle including coupling means selectably coupled to an outer end of said handle for coupling said apparatus to a propelled device;
   an adjustable umbrella pivotally mounted on said frame adjacent said handle;
   a first and a second wheel rotatably mounted on said frame at said lower end;
   a suspension mechanism slidably mounted on said frame proximate said lower end, said suspension mechanism having a first and a second leg connected to each said wheel for adjusting the distance between each said wheel;

a first platform pivotally mounted on said frame at said lower end;

an upper horizontal member and a lower horizontal member, said upper horizontal member being proximate said upper end, said lower horizontal member being proximate said lower end;

a center stake selectably penetrable mounting means for slidably mounting said center stake on said frame proximate said lower end, said center stake being selectably penetrable into a ground surface for maintaining said frame in a substantially vertical position; and a handle stake adapted to be slidingly received within said outer end of said handle, said handle stake being selectably penetrable into a ground surface with said handle extending outwardly and downwardly at an angle with respect to said frame when said frame is in said substantially vertical position.

2. A transportation apparatus as recited in claim 1, wherein each said horizontal member is expansible.

3. A transportation apparatus as recited in claim 1, including an ice chest supported by said first platform, said ice chest having a panel defining a second platform for supporting items loaded thereon, said upper horizontal member providing lateral support for said ice chest and said lower horizontal member providing lateral support for said items loaded on said second platform.

4. A transportation apparatus as recited claim 1, including:

a recreational equipment compartment; and mounting means for mounting said recreational equipment compartment on said frame.

5. A transportation apparatus as recited in claim 4, said mounting means for mounting said recreational equipment compartment on said frame comprising at least one detachable strap.

6. A transportation apparatus as recited in claim 1, said umbrella having a tent draped thereover.

7. A transportation apparatus as recited in claim 1, said umbrella supporting netting.

8. A transportation apparatus as recited in claim 1, including supply means for supplying electrical energy mounted on said frame.

9. A transportation apparatus as recited in claim 8, said supply means for supplying electrical energy including battery means.

10. A transportation apparatus as recited in claim 8, said supply means for supplying electrical energy including solar cell means.

11. A transportation apparatus as recited in claim 10, said solar cell means being mounted on said umbrella.

12. A transportation apparatus as recited in claim 1, including illumination means for providing illumination mounted on said frame.

13. A transportation apparatus as recited in claim 1, said first platform being spring biased toward said frame.

14. A transportation apparatus as recited in claim 1, said center stake being spring biased toward said frame.

15. A transportation apparatus as recited in claim 1, said handle having a plurality of tie arrangements and a hook mounted thereon.

* * * * *